US005828383A

United States Patent [19]

May et al.

[11] Patent Number: 5,828,383

[45] Date of Patent: Oct. 27, 1998

[54] CONTROLLER FOR PROCESSING DIFFERENT PIXEL DATA TYPES STORED IN THE SAME DISPLAY MEMORY BY USE OF TAG BITS

[75] Inventors: Bradley Andrew May, San Jose; Thuan Thai Hoang, Santa Clara, both of Calif.

[73] Assignee: S3 Incorporated, Santa Clara, Calif.

[21] Appl. No.: 576,870

[22] Filed: Dec. 21, 1995

Related U.S. Application Data

[60] Provisional application No. 60/000,454 Jun. 23, 1995.

[51] Int. Cl.[6] .............................. G09G 5/00; G06F 12/16

[52] U.S. Cl. .............................................. 345/507; 711/156

[58] Field of Search ..................................... 345/153, 154, 345/507, 186, 509, 515, 516, 188; 395/506, 507, 509, 501, 514; 364/965, 965.8; 711/156

[56] References Cited

U.S. PATENT DOCUMENTS

| | | | |
|---|---|---|---|
| 4,121,283 | 10/1978 | Walker | 364/200 |
| 4,956,640 | 9/1990 | Jundanian et al. | 340/799 |
| 5,193,148 | 3/1993 | Alcorn et al. | 395/157 |
| 5,231,383 | 7/1993 | Diepstraten et al. | 340/799 |
| 5,241,658 | 8/1993 | Masterson et al. | 395/162 |
| 5,243,447 | 9/1993 | Bodenkamp et al. | 345/133 |
| 5,250,933 | 10/1993 | Beaudin et al. | 345/115 |
| 5,258,826 | 11/1993 | Wakeland et al. | 345/115 |
| 5,274,753 | 12/1993 | Roskowski et al. | 395/509 |
| 5,301,272 | 4/1994 | Atkins | 395/501 |
| 5,402,147 | 3/1995 | Chen et al. | 345/189 |
| 5,406,306 | 4/1995 | Siann et al. | 345/115 |
| 5,412,766 | 5/1995 | Pietras et al. | 395/131 |
| 5,448,307 | 9/1995 | Gelissen et al. | 348/584 |
| 5,506,604 | 4/1996 | Nally et al. | 345/154 |
| 5,526,025 | 6/1996 | Selwan et al. | 345/200 |
| 5,559,954 | 9/1996 | Sakoda et al. | 395/507 |
| 5,598,525 | 1/1997 | Nally et al. | 395/507 |
| 5,604,514 | 2/1997 | Hancock | 345/154 |
| 5,608,864 | 3/1997 | Bindlish et al. | 395/507 |
| 5,644,336 | 7/1997 | Herbert | 345/154 |

*Primary Examiner*—Jeffery Brier
*Assistant Examiner*—Paul A. Bell
*Attorney, Agent, or Firm*—Fenwick & West LLP

[57] ABSTRACT

A method and apparatus is disclosed for reading display data from the same area in display memory and processing the display data as video pixel data or graphics pixel data depending on the state of at least one tag bit stored with the data. The apparatus receives display data from display memory, separates at least one tag bit from the display data and uses at least one tag bit in a controller to enable processing display data as video pixel data or graphics pixel data in each processing step. Video pixels may be corrected for missing color components with stored value if previous or next pixel in pipeline is graphics. Display memory and display memory bandwidth may be conserved by enabling video pixel data formats and graphics pixel data formats to be stored within the same display memory area.

18 Claims, 4 Drawing Sheets

CONTROLLER FOR PROCESSING DIFFERENT PIXEL DATA TYPES STORED IN THE SAME DISPLAY MEMORY BY USE OF TAG BITS

CROSS-REFERENCE TO RELATED APPLICATIONS

The present application claims priority from provisional application Ser. No. 60/000,454, entitled "Method for Using 9th Data Bit to Uniquely Process Graphics and Video Information in the Same Graphics Frame Buffer", filed Jun. 23, 1995.

FIELD OF THE INVENTION

The present invention is in the field of personal computer video graphics display controllers and in particular, relates to a novel method and apparatus for processing graphics pixel data and video pixel data stored in a display memory.

BACKGROUND OF THE INVENTION

Graphical user interfaces for personal computers frequently may display video images simultaneously with computer generated graphics. With the advent of multimedia computer systems, a diversity of display information may be routinely handled by user interfaces. Display information may correspond to data indicating how each picture element or pixel, as such display elements are known in the art, should appear on a display device.

Because of differences between display data corresponding to video display information and display data corresponding to graphics display information, each may be handled uniquely, even though data may be displayed on the same device.

Display data for both video and graphics may be processed through the same Video Graphics Adapter (VGA) controlling display of display data. A host processor may transfer display data to display memory where a VGA display controller reads display data bytes sequentially from memory in correspondence to position of the display data byte on the display as described in Chapter 3.3 p. 43, "Programmers Guide to the EGA and VGA Cards", 2nd Ed., Richard F. Ferraro, Addison Wesley, 1990 incorporated herein by reference. When display data comprises only graphics data, such display data may be mapped from a contiguous memory location to scan line position by reading display data sequentially from contiguous memory locations.

Graphics and video may be generated using different techniques and may display different types of images. Video images often comprise natural objects with continuous changes in color shade and intensity. Graphics may be fixed in color shade and intensity or, in the case of animated graphics, may use a limited and repetitive series of predetermined color values and intensities.

Traditionally, different pixel formats have been used to encode graphics and digital video pixels. For both historical and practical reasons, it is a common practice in the art to store graphics and video data types in different pixel formats in memory. Because graphics pixel data formats and video pixel data formats may be indistinguishable from each other when stored as bytes in display memory, limitations arise during reading and processing of display data comprising graphics, video, and other multimedia data types.

Graphics and video multimedia data types may be stored by a controller in Dynamic Random Access Memory (DRAM). Rambus™ DRAMs (RDRAM), as described in "RDRAM Reference Manual", Rambus, Inc., Version 1.0 DL0007-01 incorporated herein by reference, may be implemented in eight and nine-bit versions and may be suitable for the storage of video and graphic display data. The ninth bit may be commonly used as a parity bit to aid in the detection of errors in the remaining eight bits.

Graphics and video pixel formats may be based on multiples of eight bits of data commonly known as bytes. Common graphics formats may use one, two, or three bytes per pixel and common digital video formats may use one or two bytes per pixel. Graphics pixel formats may separately specify each color component (e.g., Red, Blue, Green) of each pixel in its entirety while video formats may specify some color components only for groups of two or four pixels to reduce the amount of data required to display the pixels.

FIG. 1*a* illustrates a common graphics pixel format known as RGB 565 which uses sixteen bits or two bytes to encode one pixel. Five bits may be used to encode a red color component, six bits for a green color component, and five bits for a blue color component. FIG. 1*b* illustrates the common video pixel format known as YUV 4:2:2. YUV 4:2:2 uses two bytes per pixel but groups of two pixels may be coded together with eight bits for a Y (luminance) component for each pixel and eight bits each for U and V (color difference) components of both pixels. Both of these common pixel formats may be used to carry out the preferred embodiment of the present invention.

Because individual display data may lack identifying characteristics, it may be difficult if not impossible to determine from display data which pixel format was used to encode pixel data. Consequently, prior art methods have relied on storing different pixel formats in separate areas of display memory and using display memory addresses of display data to identify pixel formats as graphics or video as illustrated in FIG. 2. Using separate areas of display memory for graphics and video requires storing, reading, and displaying all data for both graphics and video for all display operations.

A display region comprising video display data may overlay and obscure all or a portion of a display region comprising graphics display data as illustrated in FIG. 3. Conversely, a graphics display region may overlay and obscure all or part of a video display region. Thus, storing and reading data which corresponds to obscured display regions may be inefficient and undesirable. Prior art methods which maintain separate areas of display for graphics and video data encounter such inefficiencies and waste display memory area and display memory bandwidth to store and read data corresponding to the obscured regions.

SUMMARY AND OBJECTS OF THE INVENTION

A display controller generates analog display signals from encoded display data representing a variety of multimedia data types. The display data may be stored in a common memory area of a memory, with at least one tag bit indicating the data type of the display data. Display data of one type for an image portion which may be obscured by an image portion represented by display data of another type may not be stored as in prior art methods which stored all data of each data type in separate memory areas. Results of the present invention, include conservation of memory space and memory bandwidth by eliminating unnecessary reads to separate memory areas for display data which, because obscured, will not be displayed.

Because display data may be stored in the same area of display memory, the present invention includes a simplified interface for receiving the display data with at least one tag bit from display memory. Since the display data represents graphics and video data types, at least one tag bit will indicate which of at least two data types the display data represents.

The display controller of the present invention includes a processing pipeline with two sets of processing elements for processing the two types of display data. Since graphics and video data types have their own unique processing requirements each set of processing steps operates dynamically on one type of data.

To control which of at least two processing steps are used to process the display data, a pipeline control uses at least one tag bit to select which set of processing elements the display data may be processed through.

It is an object therefore, of the present invention, to minimize the memory space requirements and maximize memory bandwidth for display data by allowing display data of different types to be stored in a common area of display memory.

It is another object of the present invention to read display data without regard to display data type.

It is a further object of the present invention to process display data according to the display data type.

These and other objects of the present invention may be met by the embodiment of the present invention in an integrated circuit.

BRIEF DESCRIPTIONS OF THE DRAWINGS

FIG. 1*a* is a diagram of display data illustrating bit positions within two bytes of graphics display data known as the graphics pixel format RGB 565.

FIG. 1*b* is a diagram of display data illustrating bit positions within two bytes of video display data known as the video pixel format YUV 4:2:2.

DETAILED DESCRIPTION OF THE INVENTION

The present invention will be described in connection with FIGS. 4–7, which is by way of example only illustrating the preferred embodiment of the present invention. However, it should be appreciated that the method and apparatus of the present invention may be applied in a similar manner in other embodiments without departing from the spirit and scope of the present invention.

Figure 5:
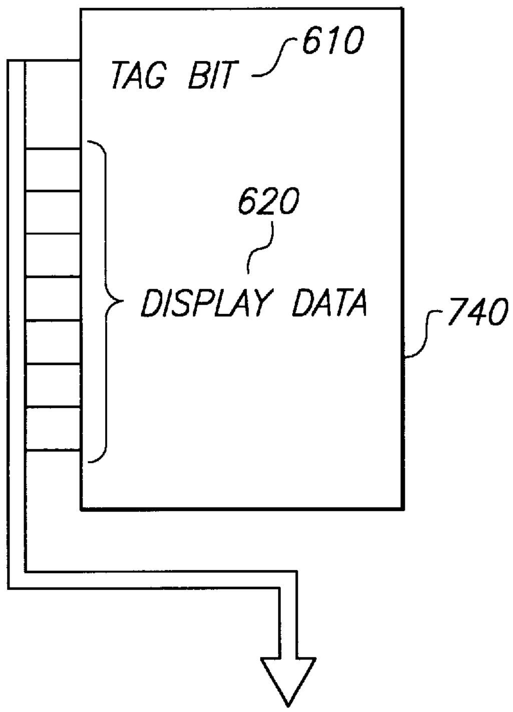
FIG. 5 is a diagram of display memory illustrating display data and at least one tag bit stored with display data in display memory.
Figure 7:
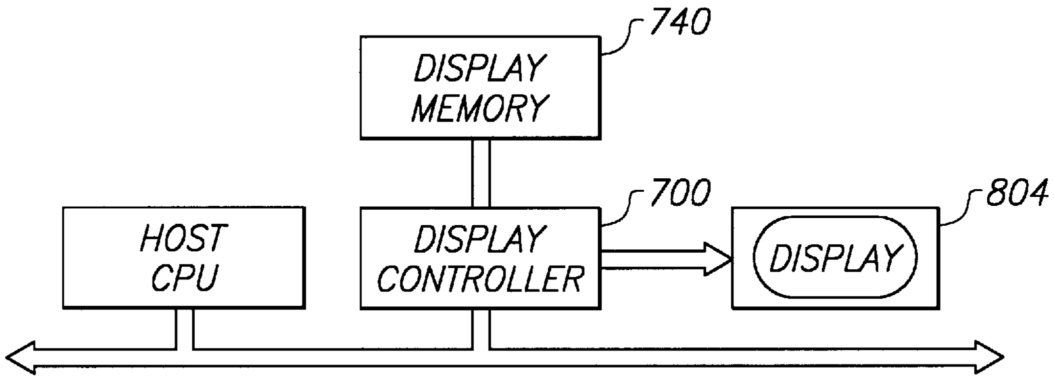
FIG. 7 is a block diagram of the main components of a personal computer system illustrating the relationship between host CPU, video graphics controller, display memory, data bus, and CRT display.
Figure 6:
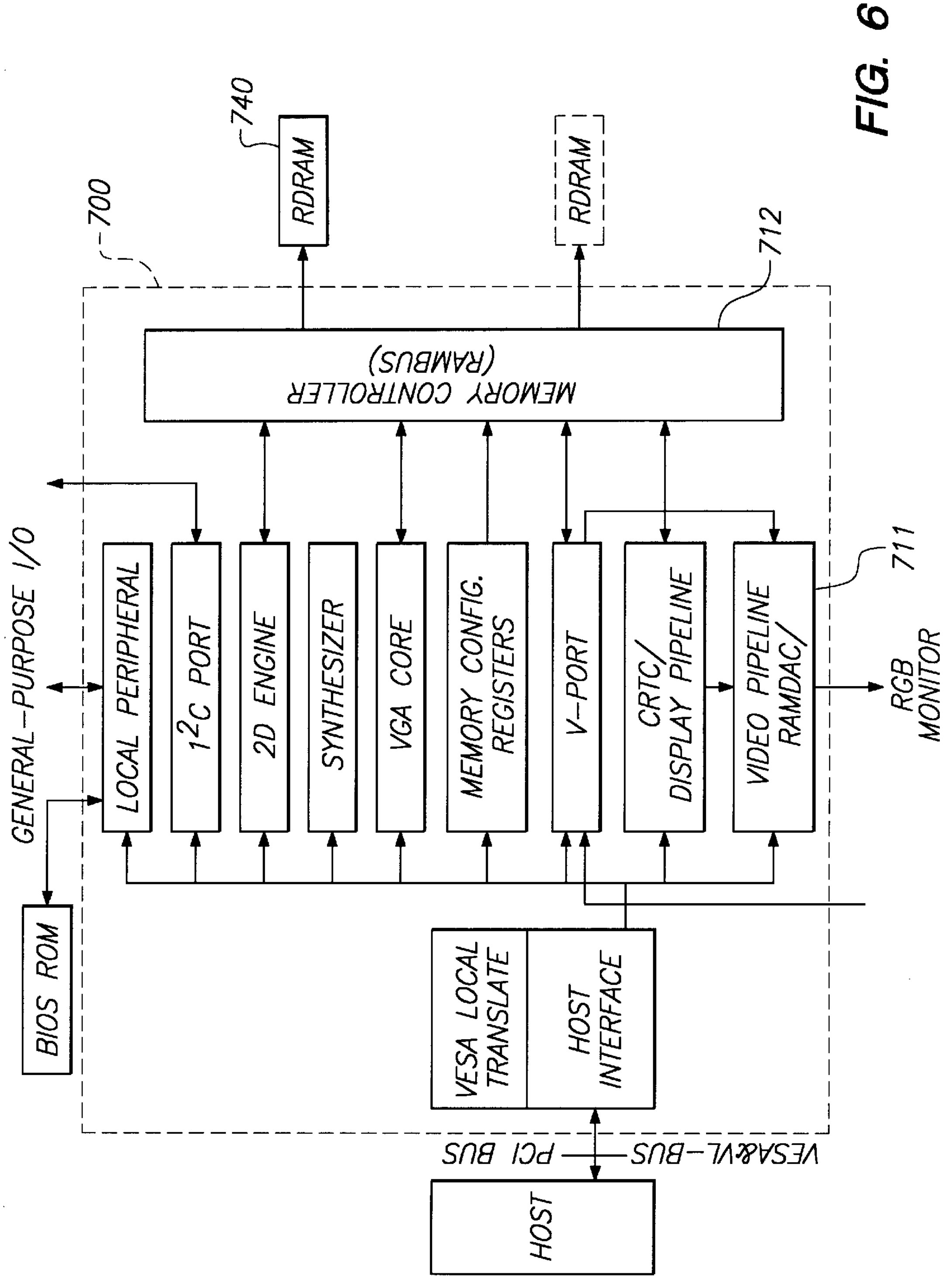
FIG. 6 is a block diagram of the invention positioned within a video graphics controller illustrating the preferred embodiment.

As illustrated in FIG. 5, 6, and 7, display controller 700 of the present invention may read display data 620 from display memory 740 which may be stored with at least one tag bit 610 indicating whether display data 620 stored at a memory location is data associated with graphics or video display data. Display controller 700 separates at least one tag bit 610 from display data 620. Pipeline control 402 uses at least one tag bit 610 to enable processing of display data 620. Once processing is complete, analog signals corresponding to red, green, and blue may be generated in video pipeline/RAMDAC 711 and output to display 804.

Memory controller 712 reads display data from display memory 740. Display memory 740 stores display data 620 and at least one tag bit 610 in the same memory location as shown in FIG. 5. Display memory 740 may comprise a Dynamic Random Access Memory (DRAM). In the preferred embodiment of the present invention, nine bit versions of Rambus™ DRAMs (RDRAM) may be used for display memory 740. The ninth data bit in an RDRAM may be intended to store byte parity information used in error detection circuits to detect errors in the remaining eight bits. In the present invention, this ninth bit may be used as at least one tag bit 610 to tag associated display data to indicate whether such data represents graphics or video information.

Figure 1A:
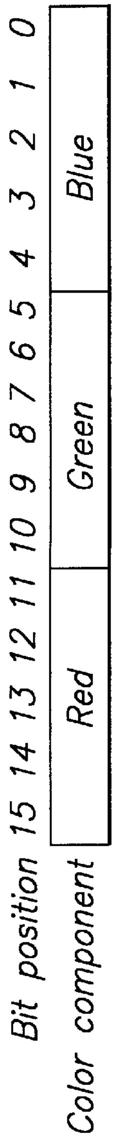
FIG. 1A (Prior Art)

Unlike prior art methods which rely on reading from separate areas of memory to distinguish between graphics and video display data, the present invention enables display data 620 to be stored without concern for pixel data format. Video encoded display data 620 and graphics encoded display data 620 may be stored with respective at least one tag bit 610 together in the same area in display memory 740. Graphics and video pixel data may be stored in one of a number of formats, for example, RGB 565 or YUV 4:2:2 described above in connection with FIGS. 1*a* and 1*b*, respectively.

At least one tag bit 610 may be stored with corresponding graphics and video pixel data and indicates which pixel data format is used for each corresponding byte of display data 620. Where display pixel data comprises more than one byte for each pixel, at least one tag bit may be used to indicate data type for all bytes of that pixel data. For example, for 16 bpp (bit per pixel) resolution (two bytes), at least one tag bit 610 from the most significant byte of display data 620 of a pixel data format may be used to identify pixel data format for both bytes and at least one tag bit 610 for the other byte of display data 620 may be discarded.

Figure 4:
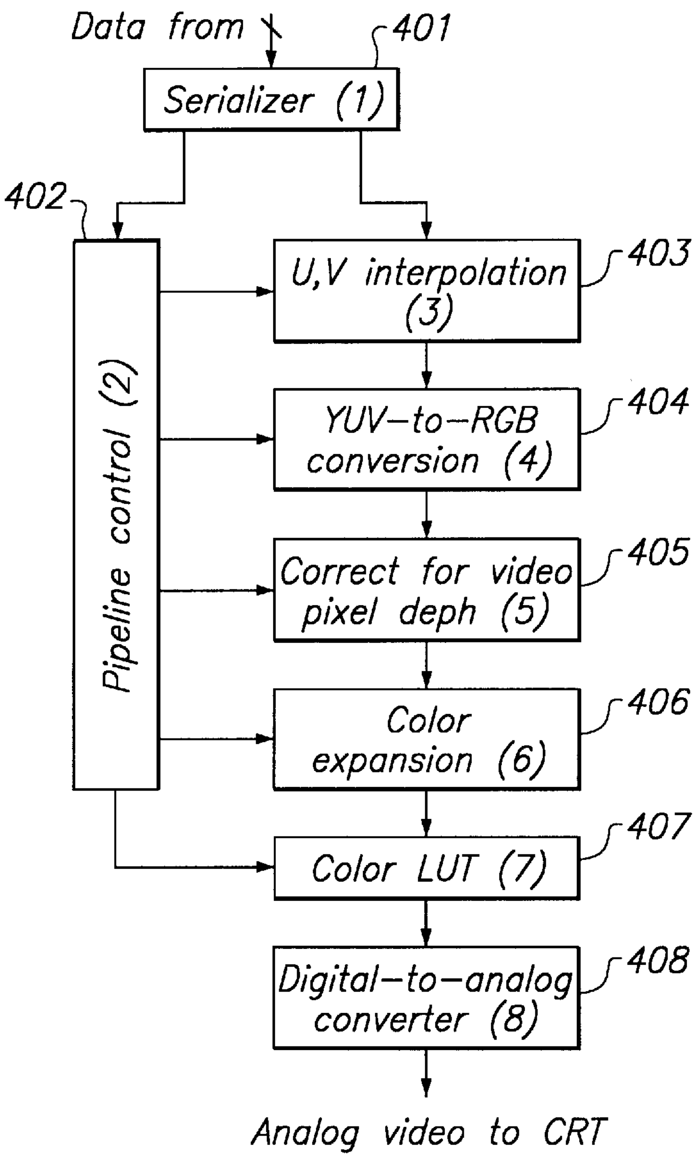
FIG. 4 is a block diagram of a portion of the display controller of the present invention illustrating processing elements for graphics and video data.

After reading display data 620 from display memory 740 in parallel, display data 620 may be transferred to serializer 401 as shown in FIG. 4. Serializer 401 receives display data 620 and at least one tag bit 610 from memory controller 712. Serializer 401 separates at least one tag bit 610 from display data 620, outputs at least one tag bit 610 to pipeline control 402, and begins to output display data 620 to U,V interpolation circuit 403. Display data 620 may be output by serializer 401 to U,V interpolation circuit 403 one pixel per machine cycle in serial.

Figure 1B:
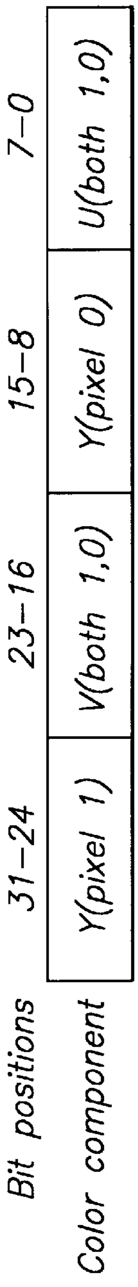
FIG. 1B (Prior Art)
Figure 2:
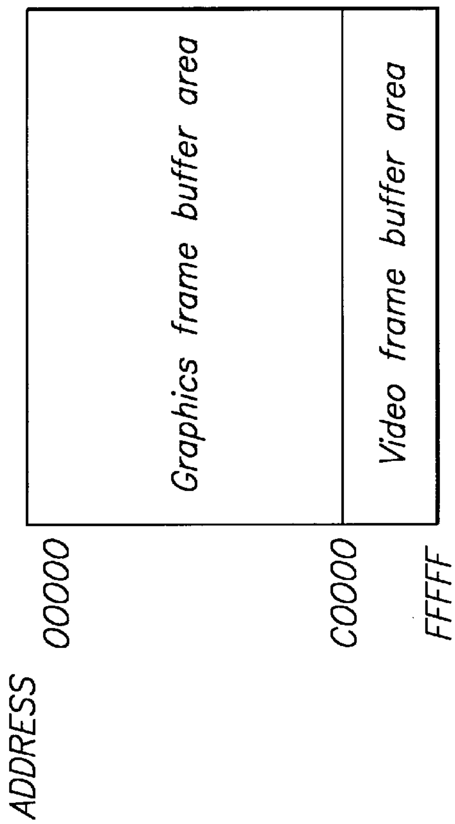
FIG. 2 (Prior Art)
FIG. 2 is a diagram illustrating prior art display memory using a separate graphics and video area in display memory to store graphics display data and video display data.
Figure 3:
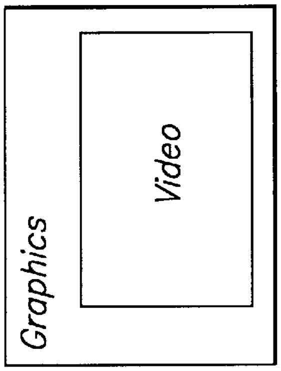
FIG. 3 is a diagram illustrating a display area having an overlap of video data on graphics data.

U,V interpolation circuit 403 generates a unique U and V value for display data 620 associated with pixel data format YUV 4:2:2 (or other video format) as shown in FIG. 1*b*. Since a single U and V value may be encoded for two pixels, U,V interpolation circuit 430 may generate intermediate U and V values interpolated from original U and V values for each two pixels. Pipeline control 402 contains at least one tag bit 610 associated with 620 currently entering U,V interpolation circuit 403. If at least one tag bit 610 indicates that display data 620 may be encoded in a graphics pixel data format, U,V interpolation circuit 403 may not process display data 620. Likewise, with other processing steps in display controller 700, pipeline control 402 uses at least one tag bit 610 to identify pixel data format of display data 620 and thus enable or withhold processing of display data 620.

YUV-to-RGB conversion circuit 404 receives serial display data 620 from U,V interpolation circuit 403. YUV-to-RGB conversion circuit 404 may be coupled to pipeline control 402 and using at least one tag bit 610 to identify the pixel data format, converts video encoded display data 620 from interpolated YUV 4:2:2 video format to RGB graphics format. Display data 620 with at least one tag bit 610 indicating graphics format may pass through YUV-to-RGB conversion circuit 404 unmodified.

In order for information to be displayed properly in VGA environment, display controller 700 assumes that all pixels stored in display memory 740 are RGB encoded graphics pixels encoded with the same number of bytes per pixel. For the graphics pixel data format previously described, each graphics pixel may be represented by one or two bytes. In the present invention, video pixels may be encoded in sets of two pixels and stored in display memory 740 together with graphics pixels. Because the video pixel format combines information for two pixels in every four bytes, four bytes of display data 620 may be required to completely describe two video pixels. Each video pixel may then require an equivalent storage space of two bytes of display data 620 which represents space occupied by two graphics pixels. Because two graphics pixels may be encoded in the same space occupied by one video pixel and display controller 700 may be expecting to display two graphics pixels, a single video pixel must take up two pixel positions upon display.

Pixel depth correction circuit 405 of the present invention receives serial display data 620 from YUV-to-RGB conversion circuit 404. Pixel depth correction circuit 405 may be coupled to pipeline control 402 and using at least one tag bit 610 to identify pixel data format, outputs the same video pixel in two consecutive pixel display cycles, when display data 620 may be encoded in video pixel data format.

Pixel depth correction circuit 405 corrects for pixel depth on video pixels without using additional memory resources. Replicating video pixels results in a reduction in memory requirements by one half for all video display data stored for display. Graphics pixels may pass through pixel depth correction circuit 405 unmodified as controlled by at least one tag bit 610.

Color expansion circuit 406 receives serial display data 620 from pixel depth correction circuit 405. Color expansion circuit 406 may be coupled to pipeline control 402 and use at least one tag bit 610 to identify pixel data format. Color expansion circuit 406 adjusts the size of each RGB color component to eight bits from whatever pixel data format value is supplied. In the RGB 565 pixel data format of FIG. 1*a*, red pixel data may be encoded in five bits, green pixel data in six bits, and blue pixel data in five bits. Color expansion circuit 406 dithers to choose random values for the missing data. In the case of red pixel data, three bits of information may be needed to complete the eight bit red pixel data value. Dithering is known to give a smoother appearance to an image.

Color Look Up Table (CLUT) circuit 407 receives serial display data 620 from color expansion circuit 406. CLUT circuit 407 may be coupled to pipeline control 402 and uses at least one tag bit 610 to identify pixel data format of display data 620. Display data 620 encoded in a graphics pixel format may be stored in an RGB format or encoded with a palette index. CLUT circuit 407 transforms the palette index used to encode the graphics pixel into an RGB value. The RGB value may be then used to display the pixel represented by display data 620. Video and graphics pixel data already encoded in RGB format may pass through CLUT circuit 407 unmodified.

Serial display data 620 regardless of stored pixel data format, may be in RGB format prior to being received by digital-to-analog conversion (DAC) circuit 408. DAC circuit 408 receives serial display data 620 from CLUT circuit 407 and generates analog red, green, and blue signals which may drive a color CRT to produce the final display output.

Pixel depth correction circuit 405 accommodates the difference in the number of bytes per pixel between graphics pixel data, at one byte or eight bits per pixel, and video pixel data at four bytes or thirty-two bits per pixel pair. There may be another problem posed by storing and attempting to retrieve dissimilar pixel formats from the same area in display memory 740. Data may be stored by the host processor in display memory and processed by display controller 700 in quantities of thirty-two bits at a time. One video pixel may be encoded in one thirty-two bit storage location or two or four graphics pixels may be stored in a thirty-two bit location. Since there may be no particular requirement that graphics pixels be stored two or four pixels together in memory it may be possible that the storage of a video pixel or group of video pixels may begin somewhere other than the beginning of a thirty-two bit pixel pair boundary.

Since similar pixels may be typically stored in large consecutive areas in memory, and since the two primary pixel data formats, graphics and video, may normally fall easily within thirty-two bit boundaries, data may be only affected at transitions in memory between different pixel data formats. Since video data may be coded with thirty-two bits per pixel pair and since it may be possible for a thirty-two bit data area in memory to contain part video and part graphics data, the video data may be incomplete at these locations. U,V interpolation circuit 403 and YUV-to-RGB conversion circuit 404 handle the incomplete video data by storing copies of the last valid Y,U, and V color components.

If one of the components is missing from video display data because of a graphics pixel and the previous pixel was a video pixel, the missing component may be replaced with the value of the corresponding component from the previous pixel. If the previous pixel was a graphics pixel, U,V interpolation circuit 403 and YUV-to-RGB conversion circuit 404 look at the next pixel in the pipeline and if it is a video pixel, the missing component may be replaced with the value of the component from that pixel. If the neither the previous pixel nor the following pixel is a video pixel containing a value for the missing Y,U, or V component the missing value in the current pixel may be replaced with the last valid value stored by U,V interpolation circuit 403 and YUV-to-RGB conversion circuit 404.

While the preferred embodiment and various alternative embodiments of the invention have been disclosed and described in detail herein, it may be apparent to those skilled in the art that various changes in form and detail may be made therein without departing from the spirit and scope thereof.

For example, while illustrated herein as coupled to a RDRAM, the memory interface of present invention may also be coupled to other types of memories or storage devices. Moreover, although the preferred embodiment is drawn to an integrated circuit, the present invention may be applied in other circuitry within a computer system without departing from the spirit and scope of the present invention.

We claim:

1. A display controller for generating display signals from display data representing multimedia data types stored in a common memory area of a memory, the display data having at least one tag bit stored therewith in a parity bit location, the tag bit indicative of a data type of the display data, said display controller comprising:

a memory interface for receiving the display data from a data portion of the memory and the at least one tag bit from a parity bit location in the memory;

a processing pipeline with a first and a second set of processing elements for processing the display data of first and second data types, respectively; and a pipeline control for using the at least one tag bit to cause said processing pipeline to process the display data of the first and second data types through one of said first and second set of processing elements.

2. The display controller of claim 1 wherein said memory interface receives the display data from a data portion of a Dynamic Random Access Memory (DRAM) and the at least one tag bit from a parity bit portion of a Dynamic Random Access Memory (DRAM).

3. The display controller of claim 1 wherein the display data of the first data type comprises video pixel data and said first set of processing elements comprises:

a U,V Interpolation circuit for interpolating U and V color component values from the video pixel data;

a YUV-to-RGB conversion circuit for converting YUV color component values from video pixel data into RGB values;

a video pixel depth correction circuit for correcting pixel depth of video pixel data; and a color expansion circuit for expanding partial RGB color component values of video pixel data converted in said YUV-to-RGB conversion circuit into full RGB color component values.

4. The display controller of claim 1 wherein the display data of the second data type comprises graphics pixel data and said second set of processing elements comprises:

a color expansion circuit for expanding partial RGB color component values of graphics pixel data into full color component values; and a color look up table circuit for converting graphics pixel data comprising color look up table index values into graphics pixel data comprising RGB color component values.

5. The display controller of claim 3 wherein said U,V Interpolation circuit and said YUV-to-RGB conversion circuit further comprise a circuit for generating missing U and V color component values in display data, said circuit comprising:

a storage means for storing last valid Y,U, and V color components; and a means for reading previous and next display data and using a color component value of a previous display data to replace a missing color component value of present display data if a color component value of the previous display is valid, and if a color component value of a previous display data is not valid, using a color component value of a next display data to replace a missing color component value of present display data if a color component value of the next display data is valid, and if a color component value of the next display data is invalid, using a last valid color component value stored in said storage means to replace a missing color component value of present display data.

6. A display controller for generating an analog display signal from display data stored in a display memory, the display data comprising display data of a first and second data types and at least one tag bit stored therewith in a parity bit location, the tag bit corresponding to the data type of the display data, said display controller comprising:

a display memory interface for receiving the display data from a data portion of the memory and the at least one tag bit corresponding to the data type of the display data from a parity bit location in the memory;

a serializer coupled to said display memory interface for receiving the display data and the at least one tag bit and for separating the at least one tag bit and the display data;

a pipeline control circuit coupled to said serializer for receiving the at least one tag bit and for using the at least one tag bit to control the processing of the display data in said graphics controller;

a U,V Interpolation circuit coupled to said serializer and to said pipeline control circuit for receiving the display data from said serializer and for receiving the at least one tag bit from said pipeline control and for using the at least one tag bit from said pipeline control for enabling said U,V Interpolation circuit to process the display data;

a YUV-to-RGB Conversion circuit coupled to said U,V Interpolation circuit and said pipeline control circuit for receiving the display data from said U,V Interpolation circuit and for receiving the at least one tag bit from said pipeline control and for using the at least one tag bit from said pipeline control for enabling said YUV-to-RGB Conversion circuit to process the display data;

a video pixel depth correction circuit coupled to said YUV-to-RGB Conversion circuit and said pipeline control circuit for receiving the display data from said YUV-to-RGB Conversion circuit and for receiving the at least one tag bit from said pipeline control and for using the at least one tag bit from said pipeline control for enabling said video pixel depth correction circuit to process the display data;

a color expansion circuit coupled to said video depth correction circuit and said pipeline control circuit for receiving the display data from said video depth correction circuit and for receiving the at least one tag bit from said pipeline control and for using the at least one tag bit from said pipeline control for enabling said color expansion circuit to process the display data;

a color look up table circuit coupled to said color expansion circuit and said pipeline control circuit for receiving the display data from said color expansion circuit and for receiving the at least one tag bit from said pipeline control and for using the at least one tag bit from said pipeline control for enabling said color look up table circuit to process the display data; and a digital-to-analog conversion circuit coupled to said color look up table circuit for receiving the display data from said color look up table circuit and for converting the display data into an analog display signal.

7. A computer system for generating a display from display data, the display data comprising display data of a first and second pixel data types and at least one tag bit stored therewith in a parity bit location, the at least one tag bit corresponding to the pixel data type of the display data, said computer system comprising a display memory for storing display data, a display unit, and a display controller for receiving display data, said display controller generating an analog display signal, said display controller comprising:

a display memory interface for receiving the display data from a data portion of the memory and the at least one tag bit corresponding to the data type of the display data from a parity bit location in the memory;

a serializer coupled to said display memory interface for receiving the display data and the at least one tag bit and for separating the at least one tag bit and the display data;

a pipeline control circuit coupled to said serializer for receiving the at least one tag bit and for using the at least one tag bit to control processing of the display data in said graphics controller;

a U,V Interpolation circuit coupled to said serializer and to said pipeline control circuit for receiving the display data from said serializer and for receiving the at least one tag bit from said pipeline control and for using the at least one tag bit from said pipeline control for enabling said U,V Interpolation circuit to process the display data;

a YUV-to-RGB Conversion circuit coupled to said U,V Interpolation circuit and said pipeline control circuit for receiving the display data from said U,V Interpolation circuit and for receiving the at least one tag bit from said pipeline control and for using the at least one tag bit from said pipeline control for enabling said YUV-to-RGB Conversion circuit to process the display data;

a video pixel depth correction circuit coupled to said YUV-to-RGB Conversion circuit and said pipeline control circuit for receiving the display data from said YUV-to-RGB Conversion circuit and for receiving the at least one tag bit from said pipeline control and for using the at least one tag bit from said pipeline control for enabling said video pixel depth correction circuit to process the display data;

a color expansion circuit coupled to said video pixel depth correction circuit and said pipeline control circuit for receiving the display data from said video pixel depth correction circuit and for receiving the at least one tag bit from said pipeline control and for using the at least one tag bit from said pipeline control for enabling said color expansion circuit to process the display data;

a color look up table circuit coupled to said color expansion circuit and said pipeline control circuit for receiving the display data from said color expansion circuit and for receiving the at least one tag bit from said pipeline control and for using the at least one tag bit from said pipeline control for enabling said color look up table circuit to process the display data; and a digital-to-analog conversion circuit coupled to said color look up table circuit for receiving the display data from said color look up table circuit and for converting the display data into an analog display signal.

8. The computer system of claim 7 wherein said display memory interface receives the display data from a data portion of a Dynamic Random Access Memory (DRAM) and the at least one tag bit from a parity bit portion of a Dynamic Random Access Memory (DRAM).

9. The computer system of claim 7 wherein said pipeline control enables said U,V Interpolation circuit to process the display data when the at least one tag bit indicates the display data is in a video pixel data format.

10. The computer system of claim 7 wherein said pipeline control enables said YUV-to-RGB conversion circuit to process the display data when the at least one tag bit indicates the display data is in said a pixel data format.

11. The computer system of claim 7 wherein said pipeline control enables said video pixel depth correction circuit to process the pixel data when the at least one tag bit indicates the display data is in a video pixel data format.

12. The computer system of claim 7 wherein said pipeline control enables said color expansion circuit to process the display data when the at least one tag bit indicates the display data is in a graphics pixel data format.

13. A method of processing display data in a display controller, the display data comprising display data of a first and second pixel data format stored in a data portion of a display memory, and at least one tag bit stored in corresponding parity bit locations in the display memory, the method comprising the steps of:

receiving the display data from a data portion of the display memory and the at least one tag bit from a parity bit portion of the display memory;

controlling processing of the display data using the at least one tag bit to direct corresponding display data to a corresponding portion of the display controller.

14. The method of claim 13 wherein the step of receiving the display data and the at least one tag bit comprises the step of receiving the display data from a data portion of a Dynamic Random Access memory (DRAM) and the at least one tag bit from a parity bit location of a Dynamic Random Access Memory.

15. The method of claim 13 wherein the step of using the at least one tag bit to control processing of the display data in the display controller comprises the step of enabling the U,V Interpolation circuit with the at least one tag bit to process the display data when the at least one tag bit indicates the display data is in a video pixel data format.

16. The method of claim 13 wherein the step of using the at least one tag bit to control processing of the display data in the display controller further comprises the step of enabling the YUV-to-RGB conversion circuit with the at least one tag bit to process the display data when the at least one tag bit indicates the display data is in a video pixel data format.

17. The method of claim 13 wherein the step of using the at least one tag bit to control processing of the display data in the display controller further comprises the step of enabling the video pixel depth correction circuit with the at least one tag bit to process the display data when the at least one tag bit indicates the display data is in a video pixel data format.

18. The method of claim 13 wherein the step of using the at least one tag bit to control processing of the display data in the display controller further comprises the step of enabling the color expansion circuit with the at least one tag bit to process the display data when the at least one tag bit indicates the display data is in a graphics pixel data format.

* * * * *